US012503130B2

United States Patent
Miura et al.

(10) Patent No.: US 12,503,130 B2
(45) Date of Patent: Dec. 23, 2025

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Aya Miura, Wako (JP); Yuji Yasui, Wako (JP); Takeru Goto, Wako (JP); Kosuke Toda, Wako (JP); Keming Ding, Wako (JP); Kenjiro Torii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/384,403

(22) Filed: Oct. 27, 2023

(65) Prior Publication Data

US 2024/0140468 A1 May 2, 2024

(30) Foreign Application Priority Data

Nov. 1, 2022 (JP) .................................. 2022-175456

(51) Int. Cl.
*B60Q 1/00* (2006.01)
*B60W 30/095* (2012.01)
(Continued)

(52) U.S. Cl.
CPC ........ *B60W 50/14* (2013.01); *B60W 30/0956* (2013.01); *G06V 20/58* (2022.01);
(Continued)

(58) Field of Classification Search
CPC ............. B60W 50/14; B60W 30/0956; B60W 2050/143; B60W 2420/403;
(Continued)

(56) References Cited

U.S. PATENT DOCUMENTS

2002/0140562 A1 10/2002 Gutta et al.
2008/0201039 A1 8/2008 Matsuoka et al.
(Continued)

FOREIGN PATENT DOCUMENTS

JP 11-078689 3/1999
JP 2008-050002 3/2008
(Continued)

OTHER PUBLICATIONS

U.S. Notice of Allowance for U.S. Appl. No. 18/202,391 dated Mar. 13, 2025.
(Continued)

*Primary Examiner* — Tai T Nguyen
(74) *Attorney, Agent, or Firm* — Amin, Turocy & Watson, LLP

(57) ABSTRACT

A driving assistance device of an embodiment includes a recognizer configured to recognize a surrounding situation of a mobile object, a determiner configured to determine, on the basis of the surrounding situation, whether to prompt a driver of the mobile object to perform a steering operation and whether there is a possibility of a risk occurring for the mobile object, and a notification controller configured to cause a speaker to output a guidance sound prompting the driver of the mobile object to perform a steering operation and a warning sound with respect to the risk on the basis of a result of the determination by the determiner, in which the notification controller causes output modes for the guidance sound and the warning sound to be different from each other.

18 Claims, 9 Drawing Sheets

(51) Int. Cl.
  *B60W 50/14* (2020.01)
  *G06V 20/58* (2022.01)
  *H04R 1/40* (2006.01)

(52) U.S. Cl.
  CPC ....... *H04R 1/403* (2013.01); *B60W 2050/143* (2013.01); *B60W 2420/403* (2013.01); *B60W 2540/18* (2013.01); *H04R 2499/13* (2013.01)

(58) Field of Classification Search
  CPC . B60W 2540/18; G06V 20/58; G06V 20/588; H04R 1/403; H04R 2499/13; H04S 7/30; H04S 2400/11
  USPC .............................................. 340/425, 425.5
  See application file for complete search history.

(56) References Cited

U.S. PATENT DOCUMENTS

| | | |
|---|---|---|
| 2012/0081219 A1 | 4/2012 | Schieban |
| 2012/0139716 A1 | 6/2012 | Nagamine et al. |
| 2016/0236681 A1 | 8/2016 | Nguyen van et al. |
| 2018/0050693 A1* | 2/2018 | Al-Deek ................ G08G 1/162 |
| 2018/0111551 A1 | 4/2018 | Suzuki et al. |
| 2019/0092321 A1* | 3/2019 | Shimizu ................ B60W 40/08 |
| 2021/0001922 A1* | 1/2021 | Aoyama ................... B62D 6/10 |
| 2021/0179093 A1* | 6/2021 | Miyamoto ............ B60W 30/12 |
| 2022/0111857 A1* | 4/2022 | Kulkarni ............... B60W 40/04 |

FOREIGN PATENT DOCUMENTS

| | | |
|---|---|---|
| JP | 2008-097501 | 4/2008 |
| JP | 2008-195338 | 8/2008 |
| JP | 2011-051468 | 3/2011 |
| JP | 2018-067198 | 4/2018 |
| JP | 2019-158935 | 9/2019 |
| JP | 2021-033570 | 3/2021 |
| JP | 2021-077141 | 5/2021 |
| WO | 2020/194686 | 10/2020 |

OTHER PUBLICATIONS

Japanese Office Action for Japanese Patent Application No. 2022-087539 mailed Jul. 29, 2025.
Japanese Office Action for Japanese Patent Application No. 2022-175456 mailed Aug. 26, 2025.

* cited by examiner

| SCENE TYPE | NOTIFICATION TYPE | SOUND TYPE | SOUND IMAGE INFORMATION |
|---|---|---|---|
| CURVED ROAD | STEERING GUIDANCE | * | MOVEMENT POSITION (START POINT: *, END POINT:*)<br>MOVEMENT SPEED: *<br>CYCLE: *** |
| | WARNING (RISK ALERT) | *** | POSITION: ***<br>CYCLE: *** |
| | MAINTENANCE OF STATUS QUO (OK NOTIFICATION) | *** | POSITION: ***<br>CYCLE: *** |
| INTERSECTION | STEERING GUIDANCE | * | MOVEMENT POSITION (START POINT: *, END POINT:*)<br>MOVEMENT SPEED: *<br>CYCLE: *** |
| | WARNING (RISK ALERT) | *** | POSITION: ***<br>CYCLE: *** |
| | MAINTENANCE OF STATUS QUO (OK NOTIFICATION) | *** | POSITION: ***<br>CYCLE: *** |
| ... | ... | ... | ... |

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-175456, filed Nov. 1, 2022, the content of which is incorporated herein by reference.

BACKGROUND

Field of the Invention

The present invention relates to a driving assistance device, a driving assistance method, and a storage medium.

Description of Related Art

In recent years, efforts to provide access to sustainable transport systems that take into account those in a vulnerable position among transport participants have become active. To achieve this, research and development related to a driving assistance technology have been focused on to further improve traffic safety and convenience. In connection with this, a technology that allows an occupant of a vehicle to identify notification information (information presentation, attention calling, warning) according to sound expressing information has been disclosed (for example, Japanese Unexamined Patent Application, First Publication No. 2019-158935).

SUMMARY

Incidentally, in the driving assistance technology, providing a sound that guides a driver in steering operations for a mobile object so that the driver can drive appropriately depending on a situation has not been considered. Therefore, a problem is that drivers may not be provided with appropriate driving assistance.

To solve the problems described above, one of the purposes of this application is to provide a driving assistance device, a driving assistance method, and a storage medium that can provide more appropriate driving assistance by notification of a sound depending on a situation. This also contributes to the development of sustainable transportation systems.

The driving assistance device, a driving assistance method, and a storage medium according to this invention have the following configuration.

(1): A driving assistance device according to one aspect of the present invention includes a recognizer configured to recognize a surrounding situation of a mobile object, a determiner configured to determine, on the basis of the surrounding situation, whether to prompt a driver of the mobile object to perform a steering operation and whether there is a possibility of a risk occurring for the mobile object, and a notification controller configured to cause a speaker to output a guidance sound prompting the driver of the mobile object to perform a steering operation and a warning sound with respect to the risk on the basis of a result of the determination by the determiner, in which the notification controller causes output modes for the guidance sound and the warning sound to be different from each other.

(2): In the aspect of (1) described above, the notification controller may cause the speaker to output a sound with a higher frequency for the warning sound than for the guidance sound.

(3): In the aspect of (2) described above, the guidance sound may have fewer harmonic overtone components than the warning sound.

(4): In the aspect of (1) described above, the notification controller may control an output of the guidance sound so that a sound image moves in a direction in which the driver is caused to steer with the driver as a reference.

(5): In the aspect of (1) described above, the notification controller may perform sound image localization such that the warning sound is output in a direction in which the risk is present with the driver as a reference.

(6): In the aspect of (1) described above, the driving assistance device may further include a target steering angle determiner configured to determine a target steering angle with respect to a traveling direction of the mobile object on the basis of the surrounding situation, in which the notification controller controls an output mode of the guidance sound on the basis of a degree of deviation between the target steering angle and a current steering angle of the mobile object.

(7): In the aspect of (1) described above, the notification controller may change at least one of a movement position and a movement speed of a sound image of the guidance sound on the basis of the degree of deviation.

(8): In the aspect of (6) described above, the notification controller may determine a start point and an end point when the sound image of the guidance sound is moved on the basis of the degree of deviation.

(9): In the aspect of (8) described above, the start point may be determined on the basis of the current steering angle of the mobile object, and the end point may be determined on the basis of the target steering angle.

(10): In the aspect of (6) described above, the notification controller may cause the speaker to output a notification sound indicating that the current steering angle is to be maintained when the degree of deviation between the target steering angle and the current steering angle of the mobile object is less than a threshold value.

(11): In the aspect of (10) described above, the notification controller may cause the sound image of the notification sound to be localized at a position according to the target steering angle or the current steering angle of the mobile object.

(12): In the aspect of (1) described above, when a sound image of the guidance sound is caused to move, the notification controller may cause the sound image to move in a horizontal direction or in a rotation direction of a driving operator performing the steering operation.

(13): In the aspect of (1) described above, when the speaker is caused to output the guidance sound when the mobile object moves backward, the notification controller may generate the guidance sound on the basis of constituent components of a backward sound output from the speaker when the mobile object moves backward.

(14): A driving assistance device according to another aspect of the present invention includes a recognizer configured to recognize a surrounding situation of a mobile object, a target steering angle determiner configured to determine a target steering angle with respect to a traveling direction of the mobile object on the basis of the surrounding situation, and a notification controller configured to cause a speaker to output a guidance sound prompting a driver of the mobile object to perform a steering operation on the basis of a target steering angle determined by the target steering angle determiner and a current steering angle of the mobile object, in which the notification controller causes an output mode for the guidance sound to be different on the basis of a degree of deviation between the target steering angle and the current steering angle of the mobile object.

(15): A driving assistance method according to still another aspect of the present invention includes, by a computer, recognizing a surrounding situation of a mobile object, determining whether to prompt a driver of the mobile object to perform a steering operation and whether there is a possibility of a risk occurring for the mobile object on the basis of the surrounding situation, causing a speaker to output a guidance sound prompting the driver of the mobile object to perform a steering operation and a warning sound with respect to the risk on the basis of a result of the determination, and causing output modes for the guidance sound and the warning sound to be different from each other.

(16): A driving assistance method according to still another aspect of the present invention includes, by a computer, recognizing a surrounding situation of a mobile object, determining a target steering angle with respect to a traveling direction of the mobile object on the basis of the surrounding situation, causing a speaker to output a guidance sound prompting a driver of the mobile object to perform a steering operation on the basis of the determined target steering angle and a current steering angle of the mobile object, and causing an output mode of the guidance sound to be different on the basis of a degree of deviation between the target steering angle and the current steering angle of the mobile object.

(17): A storage medium according to still another aspect of the present invention is a computer-readable non-transitory storage medium that has stored a program causing a computer to execute recognizing a surrounding situation of a mobile object, determining whether to prompt a driver of the mobile object to perform a steering operation and whether there is a possibility of a risk occurring for the mobile object on the basis of the surrounding situation, causing a speaker to output a guidance sound prompting the driver of the mobile object to perform a steering operation and a warning sound with respect to the risk on the basis of a result of the determination, and causing output modes for the guidance sound and the warning sound to be different from each other.

(18): A storage medium according to still another aspect of the present invention is a computer-readable non-transitory storage medium that has stored a program causing a computer to execute recognizing a surrounding situation of a mobile object, determining a target steering angle with respect to a traveling direction of the mobile object on the basis of the surrounding situation, causing a speaker to output a guidance sound prompting a driver of the mobile object to perform a steering operation on the basis of the determined target steering angle and a current steering angle of the mobile object, and causing an output mode for the guidance sound to be different on the basis of a degree of deviation between the target steering angle and the current steering angle of the mobile object.

According to the aspects of (1) to (18) described above, it is possible to perform more appropriate driving assistance with a sound notification depending on a surrounding situation.

BRIEF DESCRIPTION OF THE DRAWINGS

FIG. 2 is a diagram which shows an example of content of a scene-by-scene output mode table.

DESCRIPTION OF EMBODIMENTS

Embodiments of a driving assistance device, a driving assistance method, and a storage medium of the present invention will be described below with reference to the drawings. A driving assistance device is a device that assists with driving of a mobile object. A mobile object may include any mobile object with a person (an occupant such as a driver) on board, including vehicles with three or four wheels, two-wheeled vehicles, micro-mobilities, and the like. A mobile object is assumed to be a four-wheeled vehicle in the first embodiment and the second embodiment to be described below, and a mobile object is assumed to be a two-wheeled vehicle in the third embodiment. In the following description, a vehicle equipped with a driving assistance device is referred to as a "vehicle M." Hereinafter, a case is described in which left-hand driving regulations are applied, but when right-hand driving regulations are applied, left and right may also be read the other way around.

First Embodiment

Figure 1:
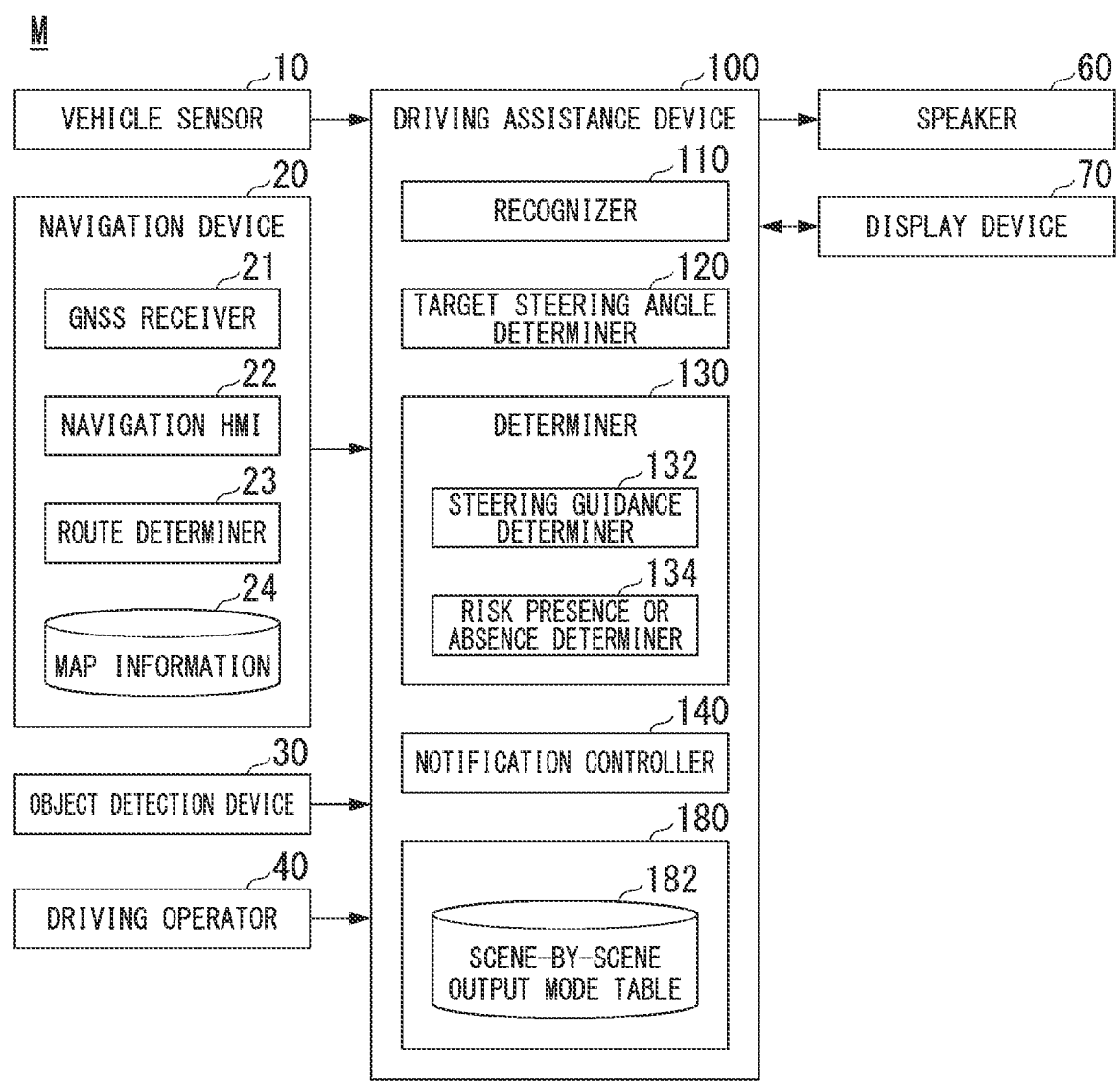
FIG. 1 is a diagram which shows devices mounted in a vehicle M, centering on a driving assistance device according to a first embodiment.

[Configuration]
FIG. 1 is a diagram which shows devices mounted in a vehicle M centering on a driving assistance device 100 according to the first embodiment. The vehicle M may be an automobile having an internal combustion engine such as a diesel engine or a gasoline engine as a power source, an electric vehicle having an electric motor as a power source, or a hybrid vehicle having both an internal combustion engine and an electric motor. In the present embodiment, components for causing the vehicle M to travel, such as a driving operator, a driving device such as an engine and a motor, a steering device, a braking device, and the like will not be shown and described, but these components may be installed in the vehicle M.

The vehicle M is equipped with, for example, a vehicle sensor 10, a navigation device 20, an object detection device 30, a driving operator 40, a speaker 60, a display device 70, a driving assistance device 100, and the like.

The vehicle sensor 10 includes, for example, a vehicle speed sensor that detects a speed of the vehicle M, an acceleration sensor that detects the acceleration, a yaw rate sensor that detects the angular speed around a vertical axis, an azimuth sensor that detects a direction of the vehicle M, and a steering angle sensor that detects a steering angle of the vehicle M (either an angle of a steering wheel or an operating angle of the steering wheel). The vehicle sensor 10 may be provided with a position sensor that detects a position of the vehicle M. The position sensor is, for example, a sensor that acquires position information (longitude and latitude information) from a global positioning system (GPS) device. The position sensor may be a sensor that acquires position information using a global navigation satellite system (GNSS) receiver 21 of the navigation device 20.

The navigation device 20 includes, for example, a GNSS receiver 21, a navigation human machine interface (HMI) 22, and a route determiner 23. The navigation device 20 holds map information 24 in a storage device such as a hard disk drive (HDD) or flash memory. The GNSS receiver 21 specifies a position of the host vehicle M on the basis of a signal received from a GNSS satellite. The position of the vehicle M may be specified or complemented by an inertial navigation system (INS) using an output of the vehicle sensor 10. The navigation HMI 22 includes a display device, a speaker, a touch panel, a key, and the like. For example, the route determiner 23 determines a route from the position of the vehicle M specified by the GNSS receiver 21 (or any position that is input) to a destination that is input by an occupant such as a driver using the navigation HMI 22 (hereinafter referred to as a route on a map) with reference to map information 24. Map information 24 is, for example, information in which road shapes are expressed by links indicating roads and nodes connected by the links. The map information 24 may include a curvature or a gradient (uphill, downhill) of a road, the number of lanes, a legal speed, road type information (for example, an urban area, a high-speed road, a general national road, a merging section, a branching section, a tollgate, a curved road, a crank, an intersection, a T-junction, or the like), point of interest (POI) information, and the like. The navigation device 20 may perform route guidance using the navigation HMI 22 on the basis of the route on the map. The route guidance may include, for example, a notification that there is a curved road in a direction in which the vehicle M is traveling, information that urges the vehicle M to turn left or right or change lanes to reach a destination, and the like. The navigation device may be realized by, for example, connecting a terminal device such as a smart phone or a tablet terminal carried by the driver with the driving assistance device 100 for communication. The navigation device 20 may acquire the latest map information 24 from an external device via a communication device (not shown) mounted on the vehicle M, or transmit a current position and a destination to a navigation server via a communication device to acquire a route equivalent to the route on the map from the navigation server.

The object detection device 30 includes, for example, a camera, a radar device, a light detection and ranging (LIDAR), a sensor fusion device, and the like. The object detection device 30 detects a type and a position of an object (another vehicle, a two-wheeled vehicle, a bicycle, a pedestrian, a road structure (a road shoulder, a curb, a median strip, a road marking line, a road sign), or the like) that is present around the vehicle M using a known function. The object detection device 30 may be capable of detecting a speed of an object.

The driving operator 40 includes, for example, an accelerator pedal, a brake pedal, a shift lever, and other operators, in addition to a steering wheel. A steering wheel is a steering operator that receives a steering operation of the vehicle M by the driver. The driving operator 40 is equipped with a sensor that detects an amount of steering or a presence or absence of an operation, and a result of the detection is output to the driving assistance device 100 or some or all of a traveling drive force output device, a brake device, and a steering device (not shown). The operator does not necessarily have to be annular, and may be in a form of a deformed steering wheel, a joystick, a button, or the like.

The speaker 60 outputs a sound into a compartment of the vehicle M. The speaker 60 may be a speaker unit including a plurality of child speakers, and in that case, a position of a sound image may be arbitrarily set. For example, when the speaker 60 is a speaker unit, one or more of the child speakers are provided at least in front of the driver's seat where the driver is seated (for example, an instrument panel inside the vehicle), on the sides (for example, the left and right doors), at the rear (for example, a headrest of the driver's seat, a rear seat, or a rear of an interior space), and the like. The plurality of child speakers may be provided so as to surround the driver's seat so that surround sound can be provided in the compartment of the vehicle as a surround speaker.

The display device 70 is, for example, a touch panel, and is attached to any place in a vehicle compartment of the vehicle M. The display device 70 receives various operations for the driving assistance device 100 and displays an image instructed by the driving assistance device 100 or the like. The speaker 60 and the display device 70 may be provided integrally with the navigation HMI 22 or may be provided separately.

The driving assistance device 100 includes, for example, a recognizer 110, a target steering angle determiner 120, a determiner 130, a notification controller 140, and a storage 180. Components other than the storage 180 are realized by a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), or a graphics processing unit (GPU), or may also be realized by software and hardware in cooperation. The program may be stored in advance in a storage device (a storage device including a non-transitory storage medium) such as a hard disk drive (HDD) or flash memory, or may be stored in a removable storage medium such as a DVD or CD-ROM (a non-transitory storage medium), and may be installed by the storage medium being mounted in a drive device.

The storage 180 may be realized by various storage devices described above, or a solid state drive (SSD), an electrically erasable programmable read only memory (EE- PROM), a read only memory (ROM), a random access memory (RAM), or the like. The storage 180 stores, for example, a scene-by-scene output mode table 182, programs, and various other types of information. The scene-by-scene output mode table 182 includes, for example, information on a guidance sound for providing steering guidance to the driver of vehicle M, and information on a warning sound (a risk alert) that a risk may occur for the vehicle M, and the like for each traveling scene of the vehicle M. Content of the scene-by-scene output mode table 182 will be described below. The map information 24 may be stored in the storage 180.

The recognizer 110 recognizes a surrounding situation (a traveling scene) of the vehicle M on the basis of a result of detection by the object detection device 30. For example, the recognizer 110 recognizes a state such as a position, a speed, acceleration, or the like, of an object around the vehicle M. The position of the object is recognized, for example, as a position on absolute coordinates with a reference point (a center of gravity, a drive shaft center, or the like) of the host vehicle M as an origin, and is used for control. The position of an object may be expressed by a representative point such as the center of gravity or a corner of the object, or may be expressed by an expressed area. The "state" of an object may include, for example, when the object is a mobile object such as another vehicle, acceleration or a jerk of the mobile object, or the "behavior state" (for example, whether the other vehicle is changing lanes or trying to change lanes).

For example, the recognizer 110 performs known analysis processing (for example, edge extraction, feature amount extraction, pattern matching processing, character recognition processing, and the like) on an image captured by a camera of the object detection device 30 (hereinafter referred to as a camera image), and recognizes targets that can identify a lane position (traveling road boundaries, road boundaries), and includes a road marking line, a road shape, a road shoulder, a curb, a median strip, a guardrail, a fence, and a wall based on a result of the image analysis. The recognizer 110 may also recognize a curvature, a gradient, and the like of a road based on a road shape, a road sign, and the like obtained according to an analysis result of the camera image.

The recognizer 110 may recognize that a shape of a road on which the vehicle M is traveling (which may include the shape of a road on which the vehicle M is predicted to travel in a near future) is a specific road section on the basis of the result of the detection by the object detection device 30. The specific road section is a road section where it is predicted that a steering angle of the vehicle M needs to be changed while traveling, such as a curved road, a crank, an intersection, a T-junction, a branch section, and a merging section. In the following description, description will be provided using a curved road as an example of the specific road section. For example, the recognizer 110 may recognize that a road on which the vehicle M is traveling or a road on which the vehicle is predicted to travel in the near future (a road in the traveling direction of the vehicle M and within a predetermined distance from the vehicle M) is a curved road, or recognize that it is not a curved road. The recognizer 110 may recognize stop lines, obstacles, traffic lights, and other road events.

The recognizer 110 may refer to the map information 24 on the basis of the position of the vehicle M detected by the vehicle sensor 10 or the GNSS receiver 21 instead of (or in addition to) recognition based on the result of the detection by the object detection device 30, recognize the shape of the road around the vehicle M including a lane in which the vehicle M is traveling or recognize the curvature of the road, and recognize whether the road is a specific road section.

The target steering angle determiner 120 determines the target steering angle with respect to the traveling direction of the vehicle M on the basis of the surrounding situation of the vehicle M recognized by the recognizer 110. For example, the target steering angle determiner 120 determines the target steering angle for causing the vehicle M to travel in a center of the traveling lane on the basis of the shape of the road on which the vehicle M travels and positional information of the vehicle M.

For example, the target steering angle determiner 120 generates a target trajectory on which the vehicle M will travel in the future with respect to the shape of the road on which the vehicle M is traveling on the basis of the surrounding situation recognized by the recognizer 110. The target trajectory may be, for example, a trajectory corresponding to the center of the lane, or a trajectory when turning left or right toward a destination at an intersection. The target trajectory is expressed as a sequence of points (trajectory points) that the vehicle M needs to reach, and may include speed elements and the like. Then, the target steering angle determiner 120 determines the target steering angle with respect to a current position of the vehicle M on the lane so that a reference point (a center of gravity, a center, or the like) of the vehicle M passes on the generated target trajectory. The target steering angle determiner 120 continuously determines the target steering angle at predetermined intervals. This makes it possible to determine an appropriate target steering angle thereof in response to changes in road shape. The target steering angle determiner 120 may determine a target angle of view when the road on which the vehicle M travels is a specific road section. The target steering angle determiner 120 may determine the target steering angle when the road is curved and the curvature of the road (or the traveling lane) is equal to or greater than a threshold value.

The determiner 130 includes a steering guidance determiner 132 and a risk presence or absence determiner 134. The steering guidance determiner 132 determines whether to provide steering guidance to the driver of the vehicle M on the basis of a target steering angle determined by the target steering angle determiner 120 and an actual steering angle of the vehicle M detected by a steering angle sensor of the vehicle sensor (hereinafter referred to as an "actual steering angle.") For example, the steering guidance determiner 132 determines to provide steering guidance when the degree of deviation between the target steering angle and the actual steering angle is equal to or greater than a threshold value (a first threshold), and determines not to provide steering guidance when it is less than the threshold value. The degree of deviation is derived according to, for example, an angular difference between the target steering angle and the actual steering angle, and the degree increases as the difference becomes larger.

The risk presence or absence determiner 134 determines whether there is a possibility of a risk occurring for the vehicle M in the near future (within a predetermined time) based on the surrounding situation recognized by the recognizer 110. The risk is, for example, a contact between the vehicle M and another object. For example, the risk presence or absence determiner 134 derives time to collision (TTC) using a relative position (a relative distance) and a relative speed between the vehicle M and another object (for example, another vehicle), determines that there is a possibility of a risk occurring (there may be a contact) when the derived time to collision (TTC) is less than a threshold value (a second threshold value), and determines that there is no possibility of a risk occurring (there may not be a contact) when it is equal to or greater than the threshold value. The time to collision (TTC) is, for example, a value calculated by dividing the relative distance by the relative speed.

The notification controller 140 causes the speaker 60 to output a corresponding notification sound (a guidance sound, a warning sound, an OK notification sound to be described below) on the basis of a result of the determination by the determiner 130. The notification sounds basically consist of sounds that do not include voice (human voice or machine voice). For example, the notification controller 140 causes the speaker 60 to output a guidance sound when it is determined to provide steering guidance to the driver of the vehicle M by the steering guidance determiner 132. The notification controller 140 causes the speaker 60 to output a warning sound when it is determined by the risk presence or absence determiner 134 that there is a possibility of a risk occurring. The notification controller 140 causes output modes for a guidance sound and a warning sound to be different from each other so that the driver can distinguish between the guidance sound and the warning sound. The output mode is, for example, a type, a component, a tempo, a cycle, or the like of a sound. The output mode may include a movement speed and a movement direction (positions of start and end points) of a sound image.

As an example of the different output modes, the notification controller 140 causes the speaker 60 to output the warning sound at a higher frequency than the guidance sound. In this case, the notification controller 140 causes a harmonic overtone component of the guidance sound to be less than that of the warning sound. Specifically, for example, when the warning sound is composed of a combination of second harmonic overtones, third harmonic overtones, and the like, a ratio or a proportion of the second harmonic overtones and the third harmonic overtones included in the guidance sound is made smaller than that of the warning sound. When the warning sound is composed of only third harmonic overtones, the guidance sound is set to be composed of second harmonic overtones or fundamental tones (single tones) which are smaller than third harmonic overtones. For example, in the case of a warning sound, the notification controller 140 performs sound image localization so that the warning sound is output from a direction in which a risk is present, and in the case of a guidance sound, the notification controller 140 controls an output of the guidance sound so that the sound image moves in a direction in which the driver is intended to perform steering. According to such an output mode, the warning sound can be output at a higher frequency and higher pitch than the guidance sound, and even in a situation where both the guidance sound and the warning sound are output at the same time, it is possible to make the warning sound more noticeable to the driver.

For example, when the driver performs a steering operation as guided after a guidance sound is output and the state after the operation is satisfactory, the notification controller 140 causes the speaker 60 to output a notification (an OK notification sound) indicating that effect. The notification controller 140 causes the speaker 60 to output an OK notification sound to maintain a current steering angle when the steering guidance determiner 132 determines that the degree of deviation between the target steering angle and the actual steering angle is less than a threshold value and steering guidance is not to be provided to the driver of the vehicle M. In this case, the OK notification sound has a different output mode from the guidance sound and the warning sound, and has, for example, less harmonic components than the guidance sound and the warning sound.

The notification controller 140 may output different notification sounds depending on a scene, in addition to a sound type of the notification sound. For example, when these notification sounds are output, the notification controller 140 refers to the scene-by-scene output mode table 182 on the basis of the surrounding situation (scene type) of a vehicle recognized by the recognizer 110, determines what kind of sound (a sound type) to use and how to perform notification (for example, sound image information) on the basis of the surrounding situation (a scene type) and content of the notification (a notification type), and causes the speaker 60 to output the determined sound.

FIG. 2 is a diagram which shows an example of the content of the scene-by-scene output mode table 182. In the scene-by-scene output mode table 182, a sound type and sound image information are associated with each other for each scene type and each notification type. The scene type includes information on the surrounding situation (a traveling scene) of the vehicle M. The scene type includes, for example, types of specific road sections such as a curved road, an intersection, and a crank. The notification type includes information on content to be notified of (for example, a steering guidance, a warning (a risk alert), maintenance of the status quo (an OK notification)). In addition to the type of a notification sound (a guidance sound, a warning sound, an OK notification sound), the sound type may include composition content of a sound, and sound data itself. The sound image information includes, for example, information on whether to fix a sound image, a movement position (a position of a start point or an end point), a movement speed, a cycle, and the like. The movement position is three-dimensional position information, and may include information on a movement direction. The sound image information may include information such as a tempo and a volume of a sound. The scene-by-scene output mode table 182 may include voice information (human voice or machine voice) in addition to the notification sound.

The information included in the scene-by-scene output mode table 182 may be set as fixed information in advance, or may be set arbitrarily by the driver. When it is set by the driver, for example, information received by the display device (a touch panel) 70 is registered (or updated) in the scene-by-scene output mode table 182.

Instead of (or in addition to) referring to the scene-by-scene output mode table 182 to obtain a notification sound according to the state or surrounding situation of the vehicle, the notification controller 140 may cause the speaker 60 to output the notification sound via a device capable of generating and synthesizing desired sounds, such as a synthesizer. The notification controller 140 may generate an image for prompting the driver to perform a steering operation or an image for maintaining the current actual steering angle, and cause the display device 70 to display the generated image in addition to (or instead of) the notification sound.

[Driving Assistance by Notification Sound]

Next, driving assistance using a notification sound according to the embodiment will be described. In the following description, a curved road will be used as an example of the specific road section, and a case of assisting the driver with driving of the vehicle M without deviating from the curved road will be described.

Figure 3:
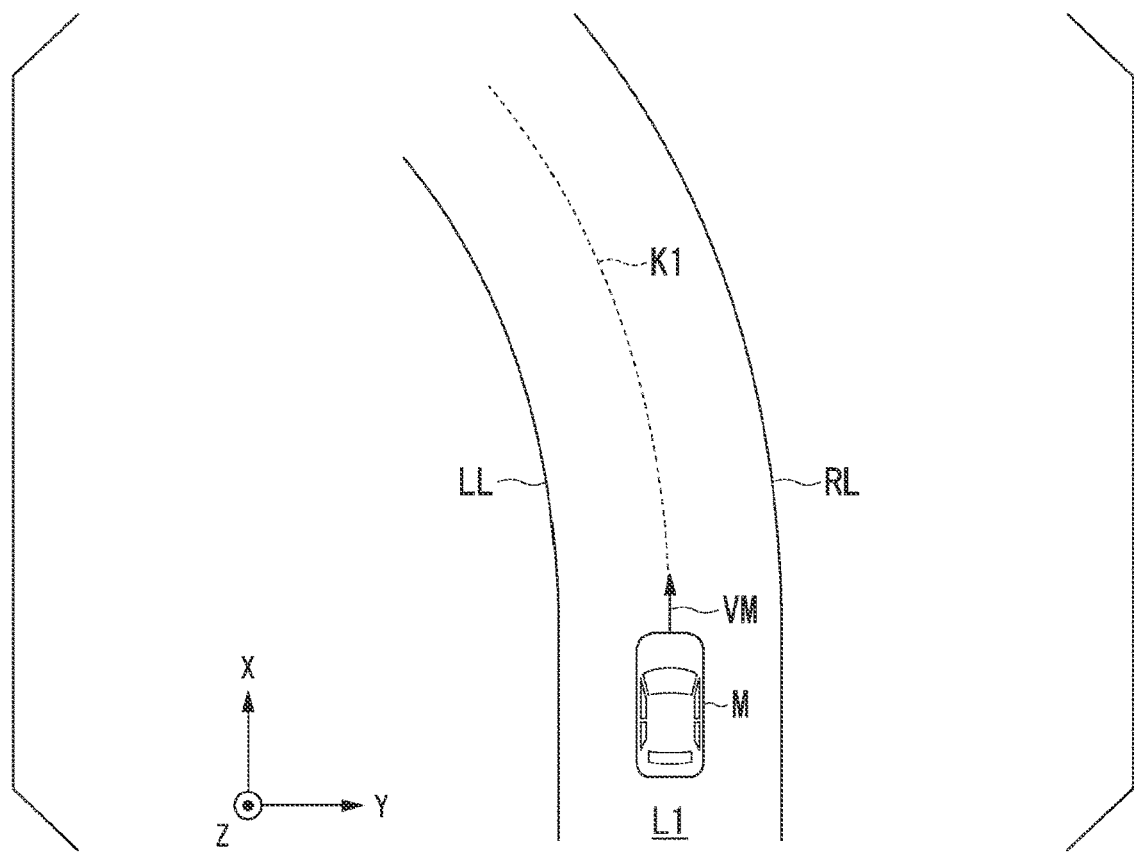
FIG. 3 is a diagram which shows a scene in which the vehicle M travels on a curved road.

FIG. 3 is a diagram which shows a scene in which the vehicle M travels on a curved road. In the example of FIG. 3, the vehicle M is traveling at a speed VM in a lane L1 defined by left and right road marking lines LL and RL. In the example of FIG. 3, it is assumed that a target trajectory K1 is generated by the target steering angle determiner 120, and that the target steering angle is determined based on the target trajectory K1 and the position of the vehicle M.

In the scene shown in FIG. 3, for example, a conventional navigation device may output a message voice such as "This is a curved road. Please be careful." However, the driver cannot ascertain a degree of curvature of the curved road in a case of such a message, and cannot ascertain an appropriate timing or extent of a steering operation required in the case of a relatively long curved road or a meandering curved road (an S curve) such as a mountain road, and appropriate driving assistance may not be performed in some cases.

For this reason, the driving assistance device 100 of the embodiment provides appropriate steering guidance to the driver by changing the output mode of the guidance sound according to the degree of deviation between the target steering angle and the actual steering angle. The driving assistance device 100 causes output modes for each of the guidance sound and the warning sound to be different from each other so that the driver may not be confused between the guidance sound and the warning sound. As a result, it is possible to perform more appropriate driving assistance.

For example, the notification controller 140 causes sound images of the guidance sound and the warning sound to be localized, and further causes a localization position of the sound image of the guidance sound to move. Localization of the sound image means, for example, determining a spatial position of a sound source that the driver perceives by adjusting a volume of a sound transmitted to left and right ears of the driver. The sound image can be determined on the basis of, for example, sound characteristics originally possessed by the sound source, information on an environment inside a vehicle compartment, or a head-related transfer function (HRTF), and the sound image can be localized to a predetermined position using such a principle. The notification controller 140 has, for example, a function of adjusting the volume of sound output from a plurality of child speakers provided inside the vehicle compartment, or synthesizing a plurality of input sounds.

Figure 4:
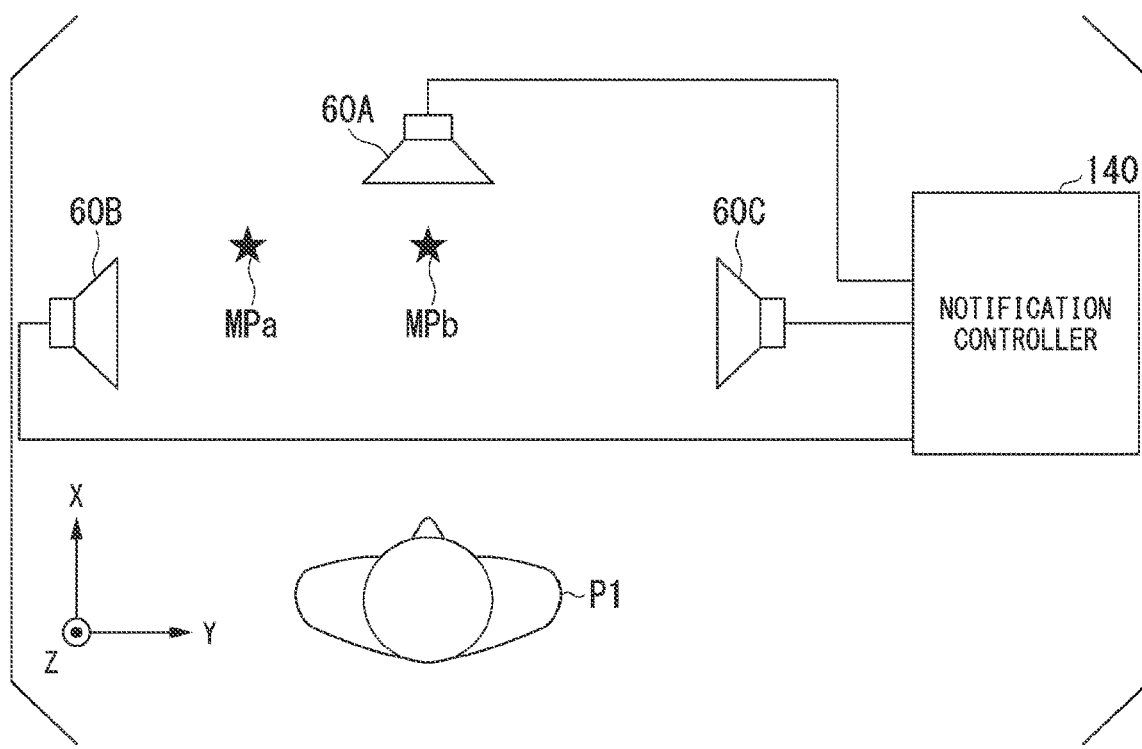
FIG. 4 is a diagram for describing localization of a sound image.

FIG. 4 is a diagram for describing localization of sound images. In FIG. 4, description is provided by using, as an example, a child speaker 60A installed in front of a driver P1 who drives the vehicle M (for example, near a center of an instrument panel inside the vehicle compartment or on the ceiling), a child speaker 60B installed on a left side of the driver P1 (for example, a left side door or a left side of the instrument panel when viewed by the driver P1), and a child speaker 60C installed on a right side of the driver P1 (for example, a right door or a right side of the instrument panel when viewed by the driver P1). However, the sound image may be localized using another child speaker installed inside the vehicle compartment, or the localization position may also be spatially moved.

For example, when the sound image of the guidance sound is localized to a spatial position MPa defined by three-dimensional coordinates (X,Y,Z) shown in FIG. 4, the notification controller 140 performs, with respect to the guidance sound, an output from the child speaker 60C at 5% of the maximum intensity, an output from the child speaker 60B at 80% of the maximum intensity, and an output from the child speaker 60A at 15% of the maximum intensity for the guidance sound. As a result, from a position of the driver P1, the driver feels that the sound image is localized to the spatial position MPa shown in FIG. 4. Similarly, when the sound image of the guidance sound is localized to a spatial position MPb, the notification controller 140 performs, with respect to the guidance sound, an output from the child speakers 60B and 60C at 45% of the maximum intensity, and an output from the child speaker 60A at 45% of the maximum intensity. As a result, from the position of the driver P1, the driver feels that the sound image is localized to the spatial position MPb shown in FIG. 4. In this manner, by adjusting the plurality of child speakers installed inside the vehicle compartment and the volume of the sound output from each child speaker, the position where the sound image is localized can be fixed or moved. Hereinafter, a spatial position where the sound image is localized will be referred to as a "sound image position MP."

Figure 5:
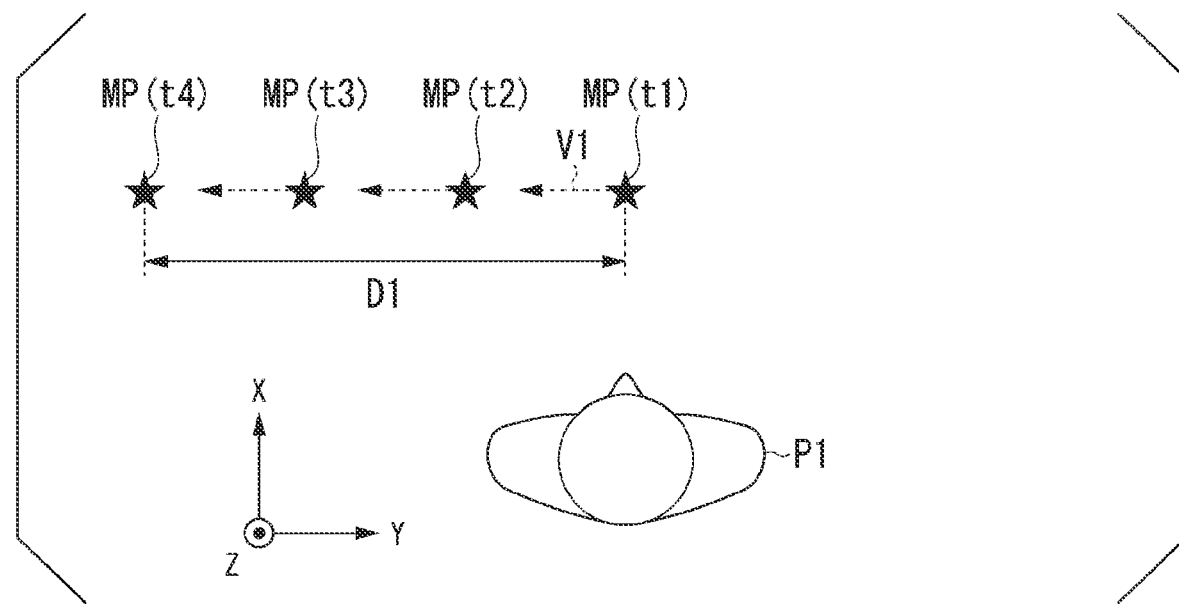
FIG. 5 is a diagram for describing how a sound image position of a guidance sound moves when a degree of deviation is large.

For example, the notification controller 140 causes a sound image position of the guidance sound to move according to the degree of deviation between the target steering angle and the actual steering angle. FIG. 5 is a diagram for describing how the sound image position MP of the guidance sound moves when the degree of deviation is large (the first predetermined value or more). The example in FIG. 5 shows how the sound image position MP is moved when the driver P1 wants to increase the actual steering angle of the vehicle M to the left through a steering operation. It is assumed that a time t1 is the earliest, and times are later in order of times t2, t3, and t4 in the example of FIG. 5. In FIG. 5, it is assumed that MP(t*) indicates the sound image position at a time t*. The same applies to subsequent drawings.

For example, when the actual steering angle is smaller than the target steering angle and the driver P1 is prompted to perform a steering operation to the left (prompted to turn the steering wheel to the left), the notification controller 140 determines a start point and an end point when the sound image of the guidance sound is moved on the basis of the degree of deviation. For example, the start point is determined on the basis of the actual steering angle of the vehicle M, and the end point is determined on the basis of the target steering angle. Therefore, as the degree of deviation becomes larger, the distance D1 from the start point to the end point increases. The start point and the end point may have fixed localization positions based on the position of the driver P1. In the example of FIG. 5, the sound image position MP (t1) indicates the start point, and the sound image position MP (t4) indicates the end point.

Next, the notification controller 140 determines a movement speed V1 of the sound image position MP according to the degree of deviation, and causes the sound image position MP of the guidance sound to move at the determined movement speed V1. In the example of FIG. 5, the sound image position MP is moved in the horizontal direction from the start point to the end point at the speed V1 between time t1 and t4. The guidance sound continues to be output while the sound image position moves. The notification controller 140 repeatedly outputs the movement of the sound image positions MP(t1) to MP(t4) of the guidance sound at a cycle according to the degree of deviation.

Figure 6:
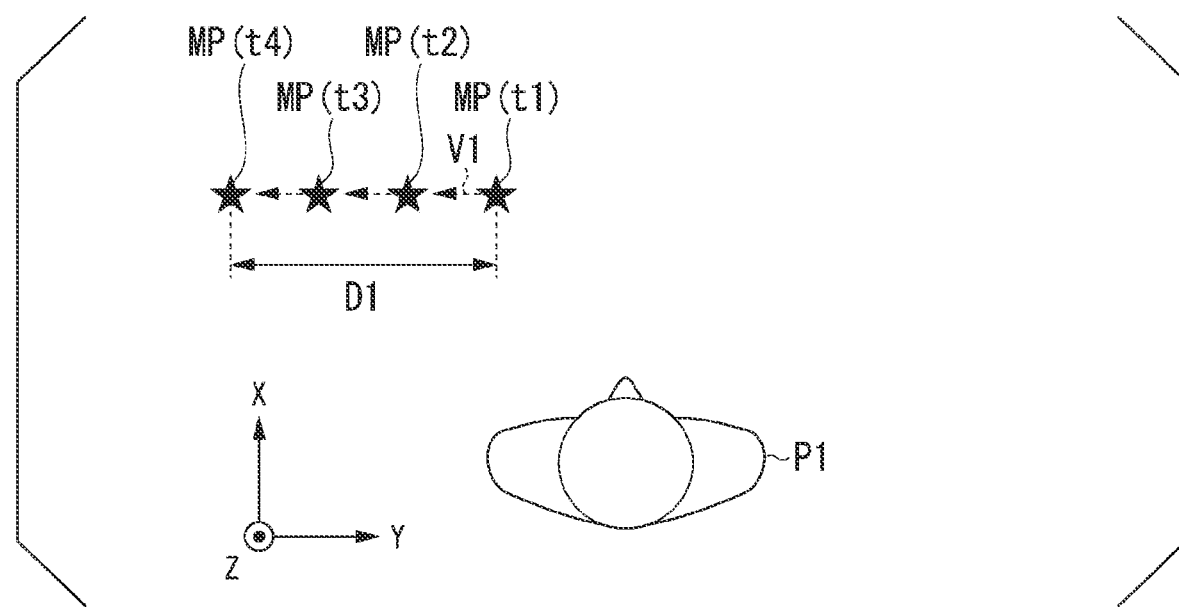
FIG. 6 is a diagram for describing how the sound image position of a guidance sound moves when the degree of deviation is small.

FIG. 6 is a diagram for describing how the sound image position MP of the guidance sound moves when the degree of deviation is small (less than the first predetermined value and greater than or equal to a second predetermined value) (the first predetermined value>the second predetermined value). In this case, the notification controller 140 makes at least one of the movement speed V1 and the movement distance D1 of the sound image position MP smaller than that of the movement shown in FIG. 5. Instead of (or in addition to) the content regarding the movement speed V1 and the movement distance D1 described above, the notification controller 140 may slow down a cycle (an output cycle) of outputting the guidance sound.

In other words, the notification controller 140 increases the distance between the start point and the end point (the distance D1 shown in FIG. 5) or the movement speed V1, or speeds up the output cycle as the degree of deviation becomes larger. The notification controller 140 may perform control such that the volume of the guidance sound is increased or the guidance sound is output at a higher frequency as the degree of deviation becomes larger. The notification controller 140 may perform control such that the movement distance D1 and the movement speed V1 of the sound image position MP increase or the output cycle is speeded up as a curvature of a traveling lane L1 becomes larger. The notification controller 140 may adjust at least one of the movement distance D1, the movement speed V1, and the output cycle of the sound image position MP depending on a width of the traveling lane L1, a size of the vehicle M, and the like.

In this manner, by changing the output mode of the guidance sound according to the degree of deviation between the target steering angle and the actual steering angle, and the like, it is possible to allow the driver P1 to ascertain the degree of deviation more clearly. The sound image position of the guidance sound moves to the left, and thereby the driver P1 can be made to more accurately recognize that a steering operation of increasing the actual steering angle of the vehicle M to the left (more specifically, an operation of turning the steering wheel to the left) is required. For example, when a message voice prompting a steering operation to the left is output, there is a possibility that driver P1 will operate the steering operation to the left or right by mistake, but as in the present invention, it is possible to suppress mistakes (erroneous recognition) between the left and right sides of the driver P1 by providing instruction on a steering direction according to the movement of the sound image position of the guidance sound.

When the degree of deviation is less than the second threshold (when the target steering angle and the actual steering angle match (including a predetermined allowance range)), the notification controller 140 ends an output of the guidance sound. The notification controller 140 may cause the speaker 60 to output the OK notification sound instead of the guidance sound. Whether to output the OK notification sound may be set by the driver P1, or may be set on the basis of a past traveling history of the driver P1.

Figure 7:
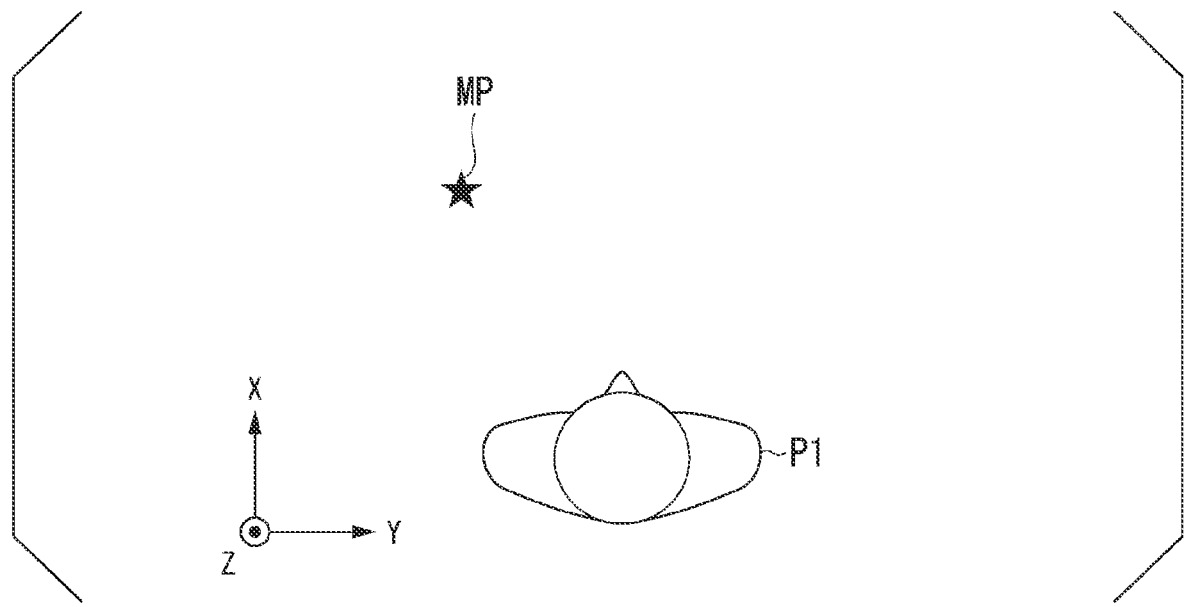
FIG. 7 is a diagram for describing the sound image position in a case of an OK notification sound.

FIG. 7 is a diagram for describing a sound image position in a case of the OK notification sound. When the OK notification sound is output, the notification controller 140 sets the sound image position MP according to the target steering angle or the actual steering angle, and causes the OK notification sound to be repeatedly output from the set position (the fixed localization position). In the example of FIG. 7, the sound image is localized to a left front position according to the actual steering angle of the driver P1. By outputting the OK notification sound, the driver P1 can be made to recognize that a current steering operation is appropriate.

The notification controller 140 causes a warning sound to be output to a predetermined sound image position when it is determined by the risk presence or absence determiner 134 that a risk may occur, regardless of whether a guidance sound or an OK notification sound is output. The predetermined position may be, for example, a direction in which there is a risk with respect to the reference point (the center of gravity or center) of the vehicle M, or a direction in which there is a risk with respect to the position of the driver P1 (the position of the driver's seat). The direction in which there is a risk is, for example, a direction in which an object that is determined to have a possibility of coming into contact with the vehicle M is present.

Figure 8:
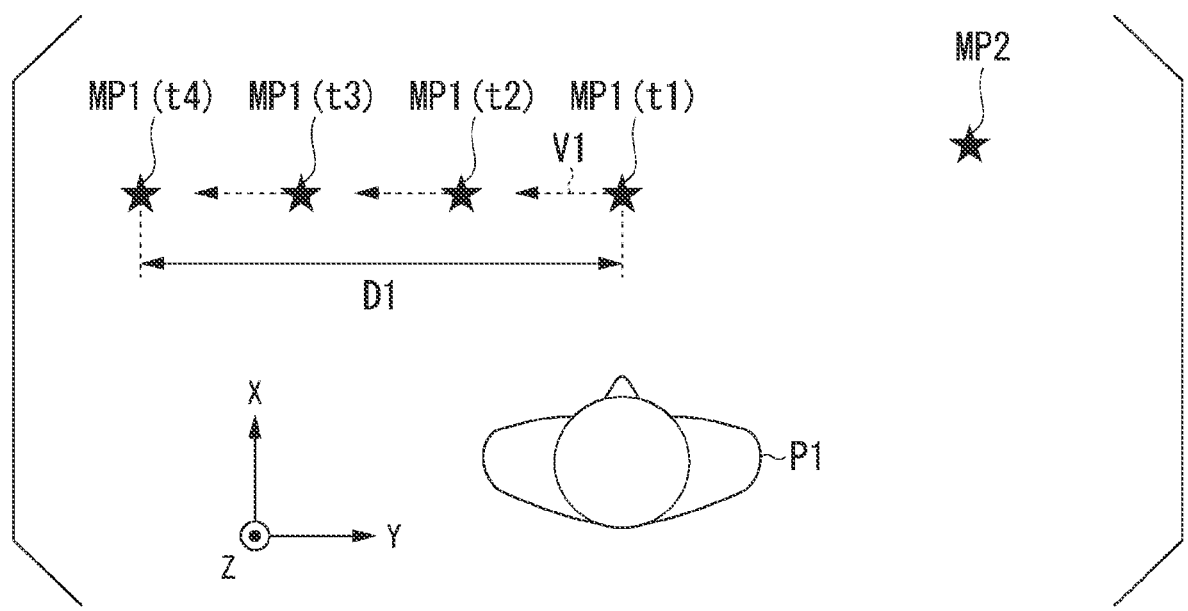
FIG. 8 is a diagram for describing a position of sound image localization of a guidance sound and a warning sound.

FIG. 8 is a diagram for describing a position of the sound image localization of a guidance sound and a warning sound. In the example of FIG. 8, a sound image position MP1 indicates a sound image position of the guidance sound, and a sound image position MP2 indicates a sound image position of the warning sound. The example in FIG. 8 shows how the sound image position MP1 of the guidance sound moves when the degree of deviation is large (when it is greater than the first predetermined value). When the guidance sound is output in the output mode as shown in FIG. 8, and when it is determined by the risk presence or absence determiner 134 that a risk may occur, the notification controller 140 causes a sound image of the warning sound to be localized in a direction in which an object (a target object) with which contact may occur when viewed by the driver P1 is present while the guidance sound is output. This makes it possible to more accurately notify the driver P1 of the possibility that a risk may occur and the direction in which the risk is present. In the example of FIG. 8, the sound image position MP2 of the warning sound is fixed, but the sound image position MP2 may be moved depending on a relative position between the vehicle M and the target object. The notification controller 140 may adjust the volume and cycle of the warning sound according to the time to collision TTC.

As shown in FIG. 8, even if both a guidance sound (or an OK notification sound) and a warning sound are provided, the guidance sound and the warning sound are different sounds, so that the driver P1 can be made to recognize both steering guidance and a warning. Since the warning sound has a higher pitch (a higher frequency sound) with more harmonic overtone components than the guidance sound, it is possible to more reliably notify the driver P1 of a risk alert (warning of possible contact).

When the warning sound is output, the notification controller 140 may end the output of the guidance sound or the OK notification sound. The notification controller 140 may cause the guidance sound to be output, or may end output of the OK notification sound because of its low importance. The notification controller 140 may set the volume of the warning sound higher than the volume of the guidance sound or the OK notification sound, and may set the volume of the guidance sound or the OK notification sound lower than the volume of the warning sound.

Modified Example

Figure 9:
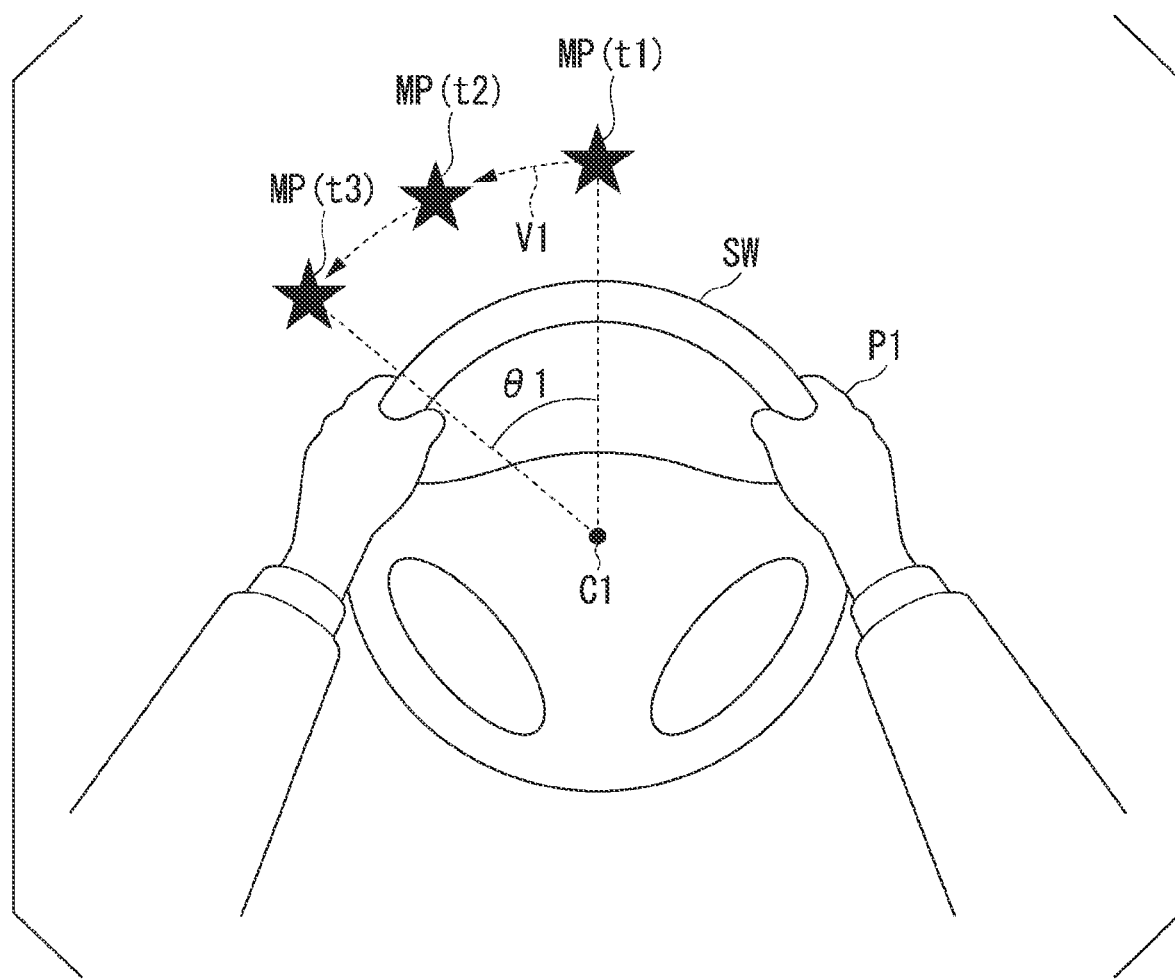
FIG. 9 is a diagram for describing how the sound image position is moved based on a rotation direction of a steering wheel.

In the embodiment, the sound image position MP of the notification sound may be moved based on the steering wheel instead of being moved in the horizontal direction as described above. FIG. 9 is a diagram for describing how the sound image position MP is moved based on a rotation direction of the steering wheel. The example in FIG. 9 shows a steering wheel SW that the driver P1 grips to perform a steering operation. The example in FIG. 9 shows how the sound image position MP is moved between the time t1 and the time t3. For example, when a guidance sound is output so that the steering angle of the vehicle M is increased to the left, the notification controller 140 causes the sound image position MP to be moved near the steering wheel SW to be operated (within a predetermined distance from the steering wheel SW). For example, the notification controller 140 causes the sound image position MP to rotate counterclockwise from the start point of the sound image (the sound image position MP (t1)) set above the steering wheel SW using a rotation axis similar to a rotation axis C1 of the steering wheel SW. An angle θ1 of rotation during one cycle and the movement speed V1 are determined according to the degree of deviation.

In this manner, by causing the sound image position MP to be moved to rotate a vicinity of the steering wheel SW using the same rotation axis as the rotation axis C1 of the steering wheel SW, it is possible to allow the driver P1 to easily ascertain that an operation for the steering wheel SW is required, that is, that a steering operation is required, and it is possible to allow the driver P1 to easily ascertain a steering direction (a direction to which the steering wheel SW is rotated) according to the movement direction of the sound image position MP. As a result, the driver P1 can perform appropriate driving without making a mistake in the steering direction.

When the vehicle M is moving backwards (reverse traveling, backward traveling), the notification controller 140 may cause the speaker 60 to output a notification sound (a backward sound or a reverse sound) that informs that the vehicle M is moving backwards. A case of moving backward is, for example, a case where a shift lever is positioned at a position for causing the vehicle M to move backward (for example, an "R" position). Furthermore, when steering guidance is performed when the vehicle M is moving backward, the notification controller 140 may perform driving assistance by outputting the guidance sound, the OK notification sound, and the warning sound described above in the output mode described above. The guidance sound and the OK notification sound in this case may be generated based on constituent components of the backward sound. In other words, the guidance sound and the notification sound that are notified when the vehicle M is moving backward are composed of components of a sound similar to the reverse sound. As a result, steering guidance can be provided while notifying the driver that the vehicle M is moving backwards.

In the embodiment described above, an example is shown in which the actual steering angle is increased to the left. However, when the actual steering angle is increased to the right, or when the vehicle passes through a curved road on the left and travels on a straight road, the driver is notified of a guidance sound guiding the sound image position to move to the right.

Since a reaction speed after the notification sound is output varies depending on the driver, the notification controller 140 may adjust a timing at which the output of the notification sound starts for each driver. In this case, the notification controller 140 stores the past traveling history for each driver, and adjusts the timing at which the output of the notification sound starts on the basis of a change tendency of an error between the target steering angle and the actual steering angle on the basis of the stored traveling history. A change tendency may be derived for each scene. For example, when it is determined that there is a driver whose reaction speed is slower than normal (a reference speed) based on the change tendency, the notification controller 140 sets the first threshold value to be compared with the degree of deviation to determine whether to perform steering guidance to be smaller than a reference value, and makes it easy to output a guidance sound at an earlier timing. When it is determined that there is a driver whose reaction speed is slow, the notification controller 140 sets the second threshold value to be compared with the time to collision TTC to determine whether there is a possibility of a risk occurring to be greater than the reference value, and makes it easy to output a warning at a faster timing.

The notification controller 140 may learn the change tendency for each driver according to an update of the traveling history, and adjust an output timing of the notification sound on the basis of a result of the learning. During the learning described above, the change tendency for each driver may be updated using functions of artificial intelligence (AI) such as machine learning (a neural network) and deep learning using teacher (correct answer) data, and the like. By adjusting the start timing of the notification sound in this manner, it is possible to perform more appropriate driving assistance for each driver.

The notification controller 140 may cause the output modes for a guidance sound and a warning sound to be different from each other depending on the speed of the vehicle M. In this case, the notification controller 140 may cause the speaker 60 to output a guidance sound (a speed guidance sound) for providing speed guidance in addition to (or instead of) steering guidance using the guidance sound. The speed guidance sound is composed of sounds different from the guidance sound for guiding steering, the OK notification sound, and the warning sound. For example, the determiner 130 determines whether to prompt the driver to perform either acceleration or deceleration depending on the degree of deviation between the speed of the vehicle M and a target speed (for example, a legal speed of the traveling lane or an average speed of surrounding vehicles). Then, when it is determined to prompt the driver to perform either acceleration or deceleration, the notification controller 140 causes the speaker 60 to output a notification sound (a speed guidance sound) that prompts the driver to perform either acceleration or deceleration. In this case, the speed guidance sound is, for example, a sound whose structure is continuously changed, and causes the structure of a sound that continuously changes to be different depending on whether the vehicle M is accelerated or decelerated. A continuously changing sound is, for example, a sound whose structure is changed by continuously increasing or decreasing a frequency or a pitch of a sound. The speed guidance sound causes, for example, sound image localization to be performed in front of the driver when acceleration is guided, and causes sound image localization to be performed behind the driver when deceleration is guided. As a result, it is possible to perform driving assistance depending on acceleration or deceleration guidance.

In addition to the output of a notification sound described above, the notification controller 140 may also cause voice information (human voice or machine voice) corresponding to content of the notification to be acquired and output from the scene-by-scene output mode table 182. For example, when the degree of deviation between the target steering angle and the actual steering angle does not decrease even after a predetermined period of time has elapsed since the guidance sound was output, the notification controller 140 causes the speaker 60 to output voice information corresponding to content of the guidance from the speaker 60. As a result, the driver can be made to more accurately understand the content of the guidance sound.

[Processing Flow]

Figure 10:
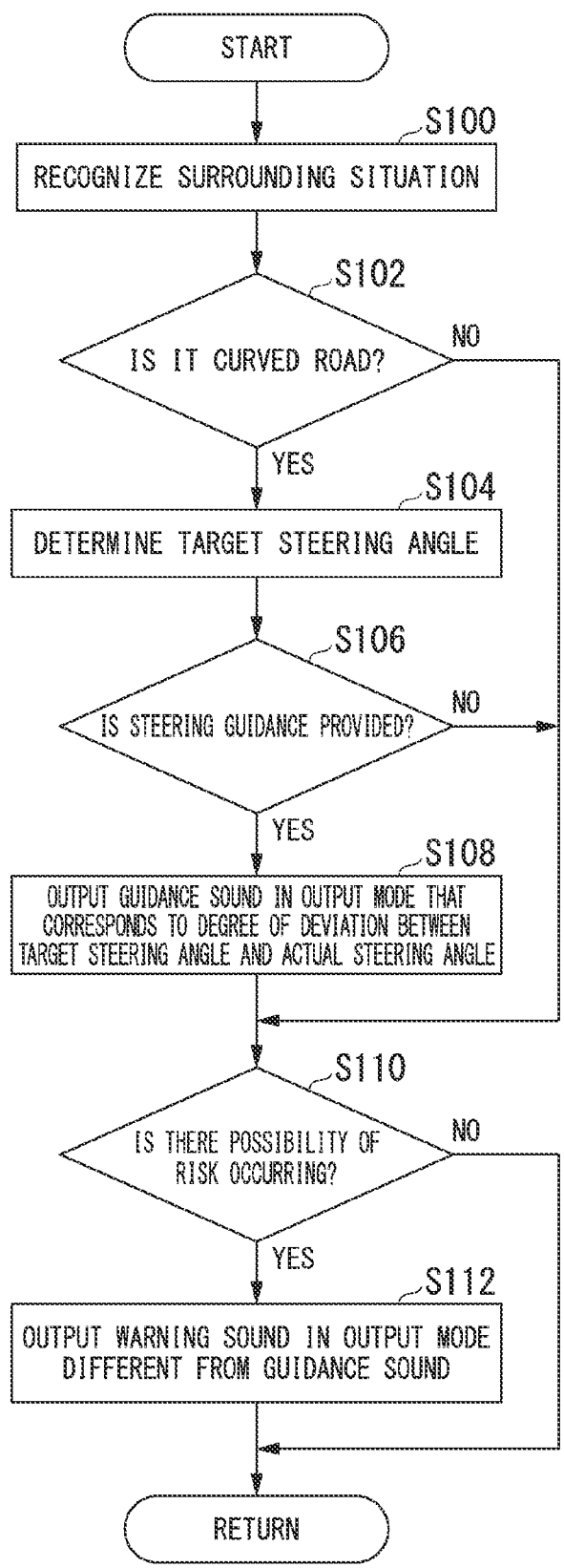
FIG. 10 is a flowchart which shows an example of a flow of processing executed by a driving assistance device of the embodiment.

FIG. 10 is a flowchart which shows an example of a flow of processing executed by the driving assistance device 100 of the embodiment. In the example of FIG. 10, among pieces of processing executed by the driving assistance device 100, the description will be provided by mainly focusing on processing related to steering guidance and a notification using a notification sound in response to a risk alert. The processing described below may be repeatedly executed at a predetermined timing or at a predetermined cycle, for example, while the driver is driving the vehicle M.

In the example of FIG. 10, the recognizer 110 recognizes a surrounding situation of the vehicle M (step S100). Next, the recognizer 110 determines whether a road on which the vehicle M is traveling is a curved road (an example of the specific road section) (step S102). When it is determined that the road is a curved road, the target steering angle determiner 120 determines a target steering angle based on a shape of the road on which the vehicle M travels and a position of the vehicle M (step S104). Next, the steering guidance determiner 132 determines whether to provide steering guidance to the driver of the vehicle M based on the degree of deviation between the target steering angle and the actual steering angle obtained from the vehicle sensor 10 (step S106). When it is determined to provide a steering guidance, the notification controller 140 causes the speaker 60 to output a guidance sound in an output mode that corresponds to the degree of deviation between the target steering angle and the actual steering angle (step S108).

After the processing of step S108, when it is determined that the road is not a curved road in the processing of step S102, or when it is determined that steering guidance is not to be provided in the processing of step S106, the risk presence or absence determiner 134 determines whether there is a possibility of a risk occurring for the vehicle M on the basis of the surrounding situation of the vehicle M (step S110). When it is determined that there is a possibility of a risk occurring, the notification controller 140 causes the speaker 60 to output a warning sound in an output mode different from that of the guidance sound (step S112). When it is determined that there is no possibility of a risk occurring after the processing of step S112 or in the processing of step S110, processing of this flowchart ends.

In the flowchart of FIG. 10, the processing of steps S102 to S108 and the processing of steps S110 to S112 may be executed in a reverse order or may be executed in parallel. In the processing of step S106, when it is determined that steering guidance is not to be provided, the notification controller 140 may cause the speaker 60 to output an OK notification sound.

According to the first embodiment described above, the driving assistance device 100 includes the recognizer 110 that recognizes the surrounding situation of the vehicle (an example of a mobile object) M, the determiner 130 that determines whether to prompt the driver of the vehicle M to perform a steering operation on the basis of the surrounding situation and whether there is a possibility of a risk occurring for the vehicle M, and the notification controller 140 that causes a speaker to output a guidance sound for prompting the driver of the vehicle M to perform a steering operation and a warning sound for risk on the basis of a result of the determination by the determiner 130, and the notification controller 140 causes the output modes for a guidance sound and a warning sound to be different from each other. The driving assistance device 100 includes the recognizer 110 described above, the target steering angle determiner 120 that determines a target steering angle with respect to the traveling direction of the vehicle M on the basis of the surrounding situation, and the notification controller 140 that causes a speaker to output a guidance sound that prompts the driver of the vehicle M to perform a steering operation on the basis of the target steering angle determined by the target steering angle determiner 120 and a current steering angle of the vehicle M, and the notification controller 140 causes an output mode of a guidance sound to be different on the basis of the degree of deviation between the target steering angle and the current steering angle of a mobile object. As a result, it is possible to provide more appropriate driving assistance according to notification of a sound corresponding to the surrounding situation. Therefore, it can contribute to the development of a sustainable transportation system.

According to the first embodiment, it is possible to output a guidance sound while changing the output mode according to a degree of steering operation. According to the first embodiment, by providing a sound-based steering guidance in each scene of a specific road section such as a curved road or an intersection, it is possible to assist with an improvement in a driving capability of the driver.

Second Embodiment

Figure 11:
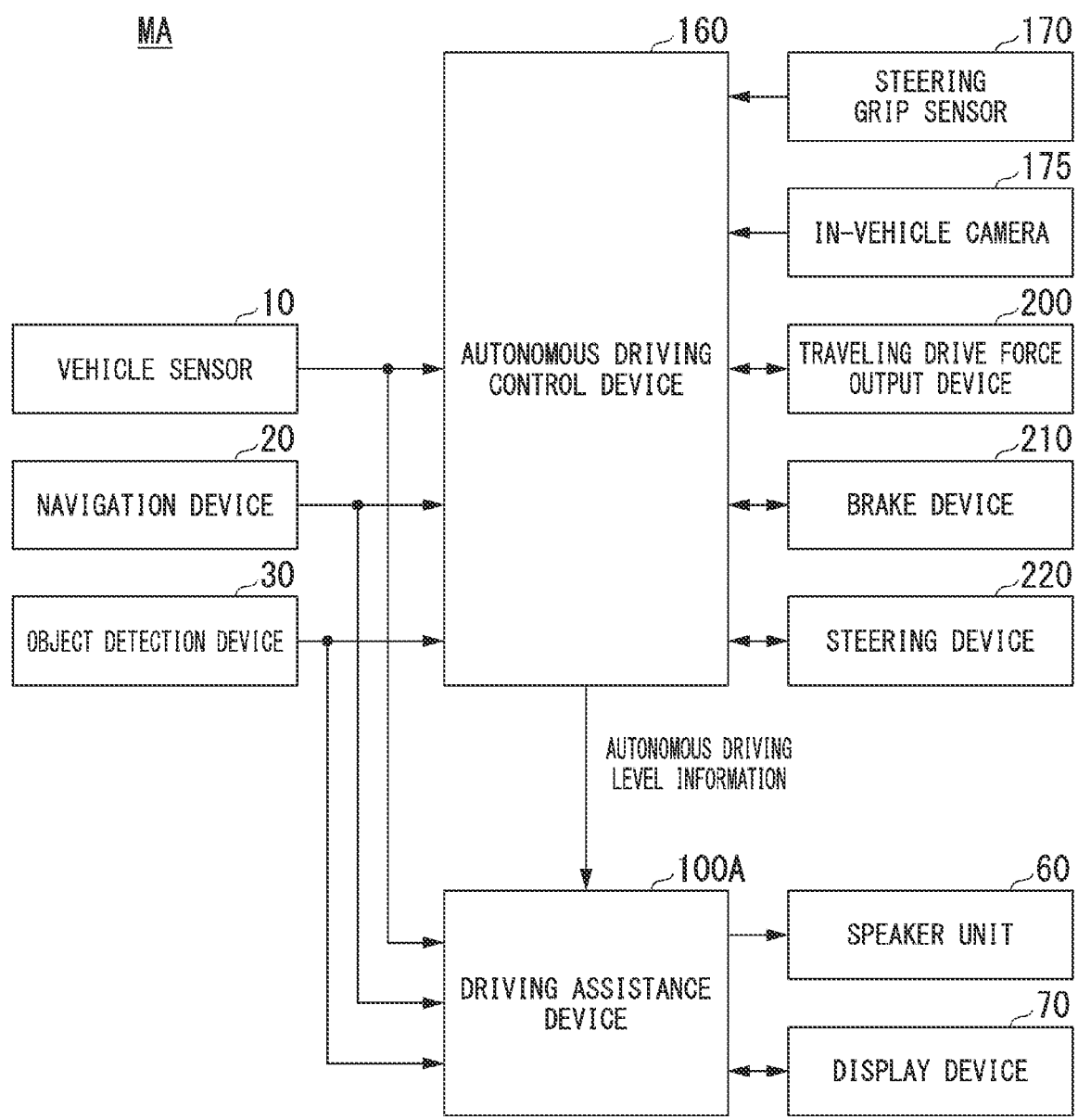
FIG. 11 is a diagram which shows devices mounted on the vehicle MA, centering on a driving assistance device according to a second embodiment.

The second embodiment will be described below. The driving assistance device of the second embodiment is mounted in an autonomous driving vehicle. Autonomous driving means, for example, automatically controlling one or both of a steering and a speed of a vehicle to perform driving control. In an autonomous driving vehicle, driving control (so-called manual driving) may be performed by a manual operation by a user (for example, a driver) of the vehicle. FIG. 11 is a diagram which shows devices mounted in the vehicle MA, centering on a driving assistance device 100A according to the second embodiment. The driving assistance device 100A is mounted in a vehicle MA together with an autonomous driving control device 160. Output data of the vehicle sensor 10, the navigation device 20, and the object detection device 30 is also input to the autonomous driving control device 160. In addition to these, output data of a navigation device and a micro processing unit (MPU) may also be input to the autonomous driving control device 160. For example, the autonomous driving control device 160 recognizes the surrounding situation of the vehicle MA and recognizes an area in which it is possible to travel near a predetermined position (for example, a center of a lane) with respect to the lane while avoiding contact with obstacles to generate a target trajectory of the vehicle MA (accompanied by a speed element), and controls a traveling drive force output device 200, a brake device 210, a steering device 220, and the like so that the vehicle MA can travel along the target trajectory. The traveling drive force output device 200 includes an engine, a traveling motor, and the like. Since various documents regarding the details of autonomous driving technology are publicly known, further description will be omitted.

The autonomous driving control device 160 is further connected to a steering grip sensor 170 and an in-vehicle camera 175. The steering grip sensor 170 is a sensor for detecting whether the driver is gripping the steering wheel, which is a steering operator, and the in-vehicle camera 175 is a camera for capturing an image of the driver's head from the front. The autonomous driving control device 160 refers to an output of the steering grip sensor 170 to determine whether the driver is gripping the steering wheel (hands-on), and analyzes the captured image of the in-vehicle camera 175 to determine whether the driver is visually recognizing (eyes-on) a traveling direction of the vehicle MA. The autonomous driving control device 160 allows one or both of releasing the steering wheel (hands-off) and directing a line of sight to a direction other than the traveling direction of the vehicle MA (eyes-off) on the basis of the surrounding environment of the vehicle MA (a type of road on which it is traveling), a speed of the vehicle MA, and the like. This allowance condition is referred to as an autonomous driving level. When an unallowable condition occurs (for example, when the driver releases his hands off from the steering wheel during a hands-on mode), the autonomous driving control device 160 notifies the driver to resolve this condition and if this is not resolved, performs processing such as switching to manual driving. The autonomous driving control device 160 outputs information on the autonomous driving level (autonomous driving level information) to the driving assistance device 100A.

The driving assistance device 100A refers to the autonomous driving level information and automatically stops operating when both hands-off and eyes-off are allowed. This is because a duty of the driver to monitor the surroundings of the vehicle MA is temporarily eliminated in this state, and the autonomous driving control device 160 performs control to avoid contact with a risk target object. Other functions are the same as those in the first embodiment. That is, when it is determined that manual driving will be performed in the autonomous driving vehicle (vehicle MA) based on the autonomous driving level information, the driving assistance device 100A executes notification control of a notification sound on the basis of the state and surrounding situation of the vehicle MA in the same manner as the driving assistance device 100 of the first embodiment.

According to the second embodiment described above, the driving assistance device 100A of the embodiment can also be applied to an autonomous driving vehicle. Therefore, according to the second embodiment, in addition to achieving the same effects as the first embodiment, it is possible to perform control that is highly compatible with autonomous driving.

Third Embodiment

Figure 12:
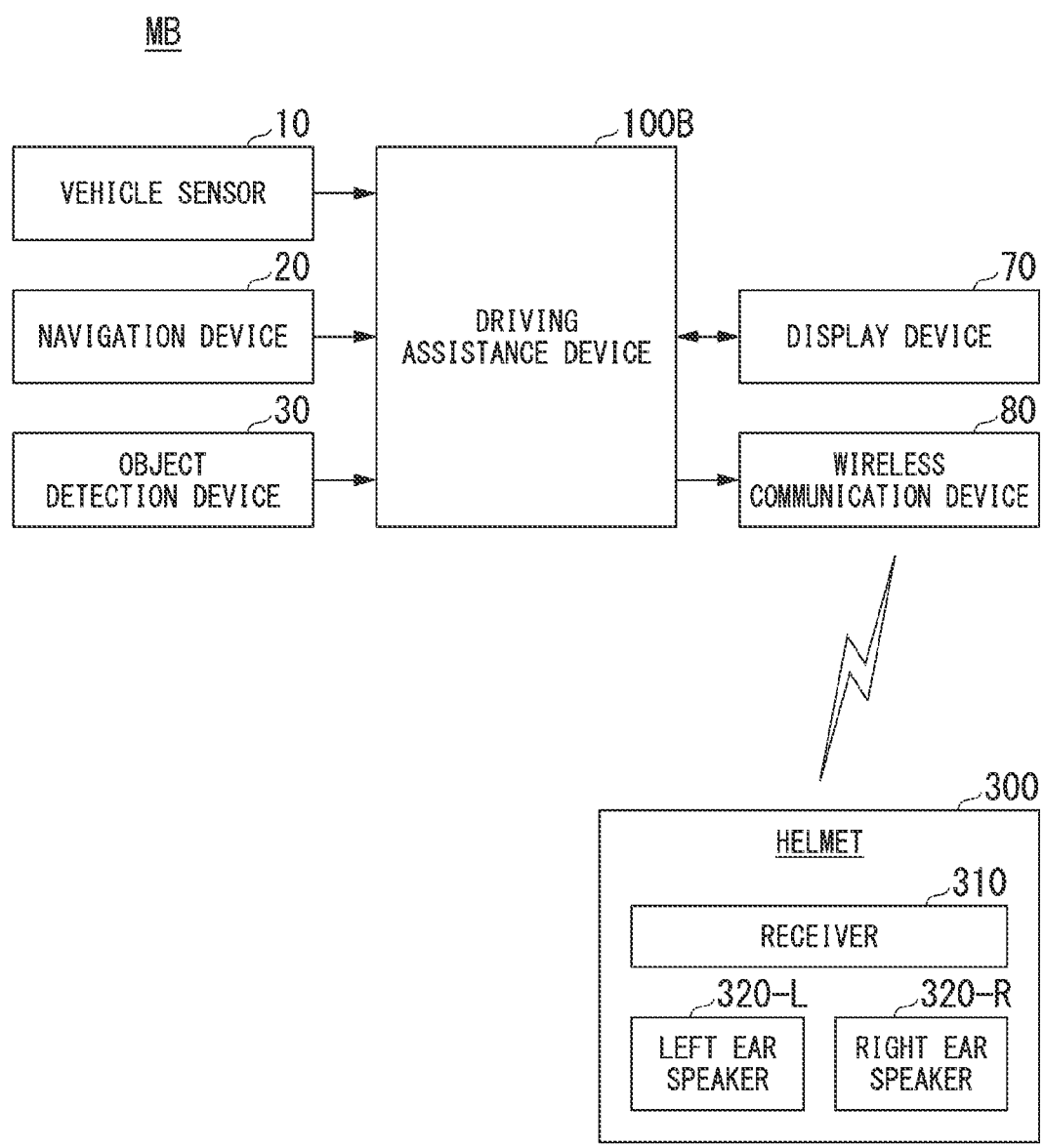
FIG. 12 is a diagram which shows devices mounted on a two-wheeled vehicle MB, centering on a driving assistance device according to a third embodiment.

A third embodiment will be described below. A driving assistance device of the third embodiment is mounted in a two-wheeled vehicle on which a driver rides with a helmet on. FIG. 12 is a diagram which shows devices mounted in a two-wheeled vehicle MB, centering on a driving assistance device 100B according to the third embodiment. The driving assistance device 100B differs from the driving assistance device 100 of the first embodiment in that it includes a wireless communication device 80 instead of controlling the speaker 60. The driving assistance device 100B instructs the wireless communication device 80 to transmit instruction information regarding a notification sound. The wireless communication device 80 performs communication on the basis of a communication standard such as Bluetooth (registered trademark).

A receiver 310, a left ear speaker 320-L, and a right ear speaker 320-R are attached to a helmet 300 worn by the driver. The helmet 300 may be provided with one or more child speakers at least in front of the head and on both left and right sides. A plurality of child speakers may be provided to surround the head as surround speakers so that a surround sound can be provided within the helmet 300.

The driving assistance device 100B performs processing similar to the processing described in the first embodiment to determine a notification sound (a guidance sound, a warning sound, or an OK notification sound) according to the state, surrounding situation, and the like of the two-wheeled vehicle MB, and causes the wireless communication device 80 to transmit instruction information for causing the left ear speaker 320-L and/or the right ear speaker 320-R to output the notification sound. The receiver 310 causes the left ear speaker 320-L, the right ear speaker 320-R, and one or both of the child speakers described above to output the notification sound on the basis of the instruction information received from the wireless communication device 80. In the third embodiment, earphones with a wireless function or the like may be used instead of the speaker provided in the helmet.

In the third embodiment, since a degree of freedom in sound image localization is reduced to some extent compared to the first and second embodiments, the notification controller 140 may cause the left ear speaker 320-L to output a guidance sound for steering guidance to the left side, and cause the right ear speaker 320-R to output a guidance sound for steering guidance to the right side. In this case, the notification controller 140 may adjust a volume and a cycle of a sound according to the degree of deviation between the target steering angle and the actual steering angle. When a warning sound is output, the notification controller 140 causes a warning sound to be output from the left ear speaker 320-L when a target object that may come into contact is present on the left side when viewed from the traveling direction (a front direction) of the vehicle MB, and causes a warning sound to be output from the right ear speaker 320-R when a target object is present on the right side. The notification controller 140 may adjust the volume and cycle of the warning sound according to the time to collision TTC.

According to the third embodiment described above, although the degree of freedom in sound image localization is reduced to some extent, the same effects as the first embodiment can be achieved in other respects.

The embodiment described above can be expressed as follows.

A driving assistance device includes a storage medium that stores computer-readable instructions, and a processor that is connected to the storage medium, the processor executes the computer-readable instructions to recognize a surrounding situation of a mobile object, determine, on the basis of the surrounding situation, whether to prompt a driver of the mobile object to perform a steering operation and whether there is a possibility of a risk occurring for the mobile object, and cause a speaker to output a guidance sound prompting the driver of the mobile object to perform a steering operation and a warning sound with respect to the risk on the basis of a result of the determination by the determiner, wherein the notification controller causes output modes for the guidance sound and the warning sound to be different from each other.

The embodiment described above can also be expressed as follows.

A driving assistance device includes a storage medium that stores computer-readable instructions, and a processor that is connected to the storage medium, the processor executes the computer-readable instructions to recognize a surrounding situation of a mobile object, determine, on the basis of the surrounding situation, a target steering angle with respect to a traveling direction of the mobile object, cause a speaker to output a guidance sound prompting a driver of the mobile object to perform a steering operation on the basis of the determined target steering angle and a current steering angle of the mobile object, and cause an output mode for the guidance sound to be different on the basis of a degree of deviation between the target steering angle and the current steering angle of the mobile object.

Although a mode for implementing the present invention has been described above using embodiments, the present invention is not limited to these embodiments in any way, and various modifications and substitutions can be added within a range not departing from the gist of the present invention.

What is claimed is:

1. A driving assistance device comprising:
   a recognizer configured to recognize a surrounding situation of a mobile object;
   a determiner configured to determine, based on the surrounding situation, whether to prompt a driver of the mobile object to perform a steering operation and whether there is a possibility of a risk occurring for the mobile object; and
   a notification controller configured to cause a speaker to output a guidance sound prompting the driver of the mobile object to perform a steering operation and a warning sound with respect to the risk based on a result of the determination by the determiner,
   wherein the notification controller causes output modes for the guidance sound and the warning sound to be different from each other.

2. The driving assistance device according to claim 1,
   wherein the notification controller causes the speaker to output a sound with a higher frequency for the warning sound than for the guidance sound.

3. The driving assistance device according to claim 2,
   wherein the guidance sound has fewer harmonic overtone components than the warning sound.

4. The driving assistance device according to claim 1,
   wherein the notification controller controls an output of the guidance sound so that a sound image moves in a direction in which the driver is caused to steer with the driver as a reference.

5. The driving assistance device according to claim 1,
   wherein the notification controller performs sound image localization such that the warning sound is output in a direction in which the risk is present with the driver as a reference.

6. The driving assistance device according to claim 1, further comprising:
   a target steering angle determiner configured to determine a target steering angle with respect to a traveling direction of the mobile object based on the surrounding situation,
   wherein the notification controller controls an output mode of the guidance sound based on a degree of deviation between the target steering angle and a current steering angle of the mobile object.

7. The driving assistance device according to claim 6, wherein the notification controller changes at least one of a movement position and a movement speed of a sound image of the guidance sound based on the degree of deviation.

8. The driving assistance device according to claim 6, wherein the notification controller determines a start point and an end point when the sound image of the guidance sound is moved based on the degree of deviation.

9. The driving assistance device according to claim 8,
   wherein the start point is determined based on the current steering angle of the mobile object, and
   the end point is determined on the basis of the target steering angle.

10. The driving assistance device according to claim 6,
    wherein the notification controller causes the speaker to output a notification sound indicating that the current steering angle is to be maintained when the degree of deviation between the target steering angle and the current steering angle of the mobile object is less than a threshold value.

11. The driving assistance device according to claim 10,
    wherein the notification controller causes the sound image of the notification sound to be localized at a position according to the target steering angle or the current steering angle of the mobile object.

12. The driving assistance device according to claim 1,
    wherein, when a sound image of the guidance sound is caused to move, the notification controller causes the sound image to move in a horizontal direction or in a rotation direction of a driving operator performing the steering operation.

13. The driving assistance device according to claim 1,
    wherein, when the speaker is caused to output the guidance sound when the mobile object moves backward, the notification controller generates the guidance sound based on constituent components of a backward sound output from the speaker when the mobile object moves backward.

14. A driving assistance device comprising:
    a recognizer configured to recognize a surrounding situation of a mobile object;
    a target steering angle determiner configured to determine a target steering angle with respect to a traveling direction of the mobile object based on the surrounding situation; and
    a notification controller configured to cause a speaker to output a guidance sound prompting a driver of the mobile object to perform a steering operation based on a target steering angle determined by the target steering angle determiner and a current steering angle of the mobile object,
    wherein the notification controller causes an output mode for the guidance sound to be different based on a degree of deviation between the target steering angle and the current steering angle of the mobile object.

15. A driving assistance method comprising:
    by a computer,
    recognizing a surrounding situation of a mobile object;
    determining whether to prompt a driver of the mobile object to perform a steering operation and whether there is a possibility of a risk occurring for the mobile object based on the surrounding situation;
    causing a speaker to output a guidance sound prompting the driver of the mobile object to perform a steering operation and a warning sound with respect to the risk based on a result of the determination; and
    causing output modes for the guidance sound and the warning sound to be different from each other.

16. A driving assistance method comprising:
    by a computer,
    recognizing a surrounding situation of a mobile object;
    determining a target steering angle with respect to a traveling direction of the mobile object based on the surrounding situation;
    causing a speaker to output a guidance sound prompting a driver of the mobile object to perform a steering operation based on the determined target steering angle and a current steering angle of the mobile object; and
    causing an output mode of the guidance sound to be different based on a degree of deviation between the target steering angle and the current steering angle of the mobile object.

17. A computer-readable non-transitory storage medium that has stored a program causing a computer to execute:
    recognizing a surrounding situation of a mobile object;
    determining whether to prompt a driver of the mobile object to perform a steering operation and whether there is a possibility of a risk occurring for the mobile object based on the surrounding situation;

causing a speaker to output a guidance sound prompting the driver of the mobile object to perform a steering operation and a warning sound with respect to the risk based on a result of the determination; and causing output modes for the guidance sound and the warning sound to be different from each other.

18. A computer-readable non-transitory storage medium that has stored a program causing a computer to execute:

recognizing a surrounding situation of a mobile object;

determining a target steering angle with respect to a traveling direction of the mobile object based on the basis of the surrounding situation;

causing a speaker to output a guidance sound prompting the driver of the mobile object to perform a steering operation based on the determined target steering angle and a current steering angle of the mobile object; and causing an output mode for the guidance sound to be different based on a degree of deviation between the target steering angle and the current steering angle of the mobile object.

* * * * *